L. C. STEELE
Aug. 2, 1932. METHOD OF MANUFACTURING SHEET METAL Re. 18,551
Original Filed April 18, 1922
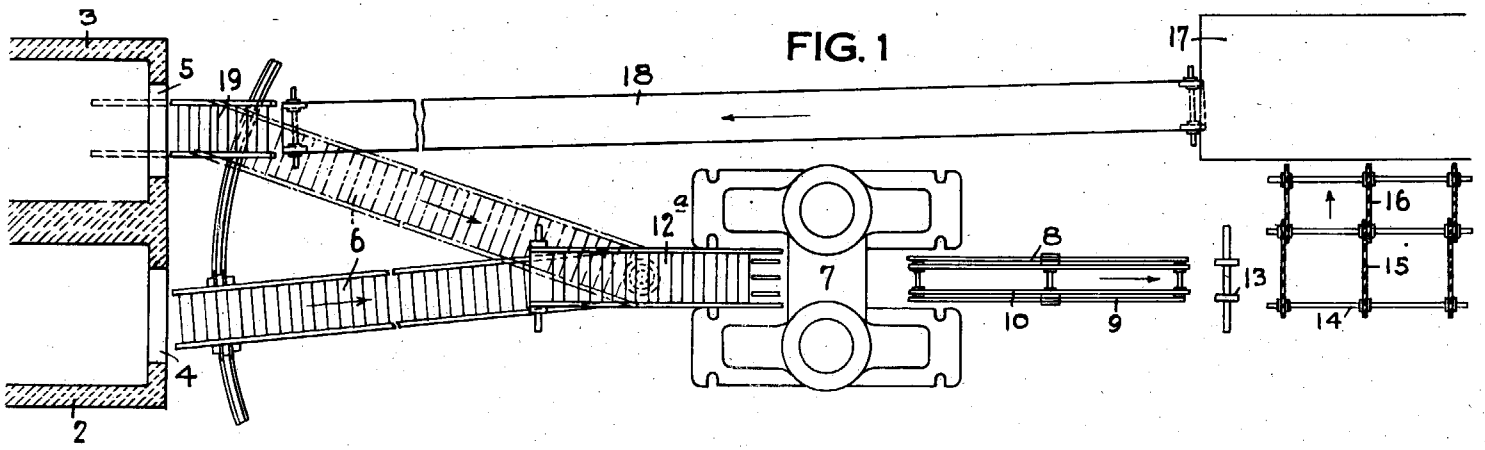
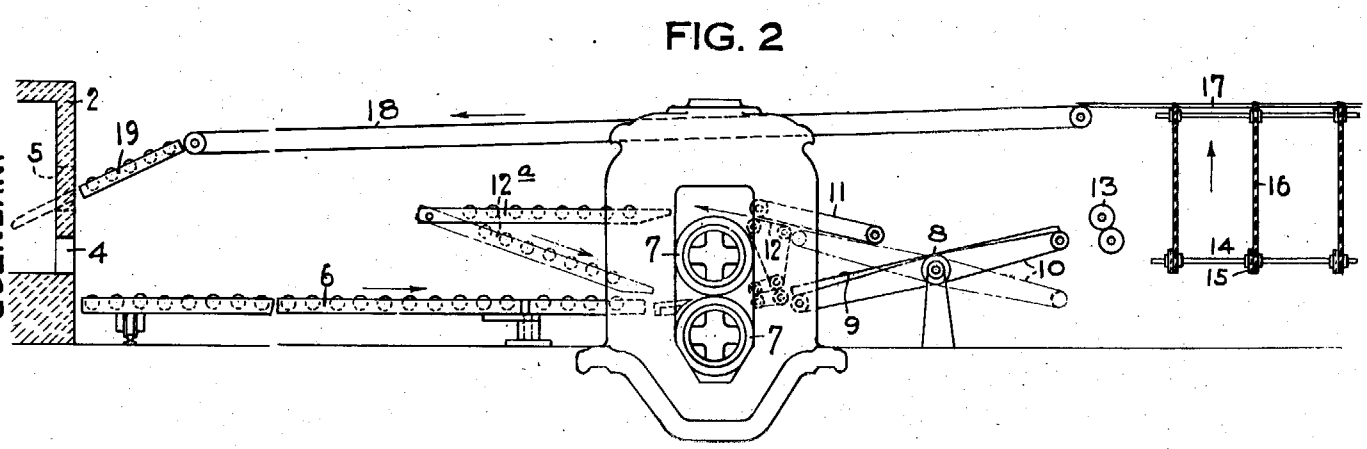
INVENTOR
Laurence C. Steele
By Kay Fellows & Brown
Attys Reissued Aug. 2, 1932 Re. 18,551

UNITED STATES PATENT OFFICE

LAWRENCE C. STEELE, OF YOUNGSTOWN, OHIO

METHOD OF MANUFACTURING SHEET METAL

Original No. 1,532,607, dated April 7, 1925, Serial No. 554,573, filed April 18, 1922. Application for reissue filed June 13, 1932. Serial No. 617,014.

My invention relates to a method of manufacturing sheet-metal.

In the present method of rolling sheets for tin-plate the heated bars are taken from the furnace in pairs and are passed one at a time in succession through the rolls, the bars being fed by hand through the rolls and passed back over the tops of the rolls for three or four passes. The rolled bars are then "matched" by placing one on top of the other, and are put back in the furnace to be reheated, whereupon they are again brought out and passed together through the rolls. This heating of the matched-bars and passing them through the rolls is commonly known as the "run-over pass". The purpose of this last-named rolling operation is more to reduce the thickness of the pack than to obtain elongation, so that the metal can be doubled by hand, which is done after this rolling operation. After the doubling, the pack, which is 4-ply, is put back into the furnace, reheated, brought out, and repassed the required number of times through the rolls, when it is opened (this is done by pulling the sheets apart with tongs), is doubled again to form 8-ply, reheated, and passed through the rolls a sufficient number of passes to bring the pieces to the specified length. The sheets are then sheared into the required sizes and the packs opened by hand, this being required because the sheets have stuck more or less together in the process of rolling. The sheets are then annealed and treated by subsequent operations to obtain the desired product, such as tin-plate, sheet-iron, etc.

In this old method of handling the sheets in rolling, the bars, in the first instance, when drawn from the furnace, were thrown on the floor, where they were picked up by the roller by tongs to pass through the rolls. After the bars had been rolled they were matched on the mill-floor, and in this matching were liable to pick up grease, scale or dirt from said mill-floor, and as the subsequent doubling was likewise done on the mill-floor, the sheets had further opportunity to pick up grease, scale or dirt, and in the rolling of the sheets this foreign matter would be rolled into the metal, and when the packs were separated the defects caused by such dirt or scale would show up and the sheets would have to be thrown aside as wasters.

The object of my invention is to provide a method of manufacturing sheet-metal which dispenses with the "run-over pass" thereby doing away with the time and expense of the extra heating and rolling of the metal, and thereby greatly reducing the cost. A further object of my invention is to eliminate the danger of scale, grease or dirt getting between the sheets when the sheets are matched or doubled on the mill-floor, thereby greatly reducing the waste and increasing the production accordingly for the same amount of time and labor expended.

In the accompanying drawing I have illustrated suitable apparatus for carrying out my improved method, although it is understood that this apparatus may be modified or changed without affecting the scope of my invention. Fig. 1 of the drawing is a plan view; and Fig. 2 is a side elevation.

In carrying out my improved method I employ suitable heating-furnaces, such as indicated by the numerals 2 and 3, said furnaces being provided with the doors 4 and 5 respectively. The bars are heated in the furnace 2 and when withdrawn therefrom are placed on a suitable feed-table 6 which feeds the bars up to the rolls 7. The bars are fed automatically to the rolls, and passing through said rolls are delivered on to the catcher 8, illustrated diagrammatically. This catcher consists, generally of the skids 9 to receive the sheet or pack; the rotary carrier 10 which lifts the material from the skids and lifts it up to the conveyer 11 which in conjunction with an endless chain on the carrier 10 and the endless chain 12 delivers the material over the top roll to the feed-table 12*a* to be returned through the rolls. In this manner the metal is rolled back and forth through the rolls without coming in contact with the mill-floor until it has been reduced to the proper gauge, whereupon the sheets, after the final pass, are delivered to the feed-rolls 13 to be discharged on the feed-table 14 composed of the conveyers 15 which travel at right angles to the travel of the rolls 13.

From the table 14 the sheets are delivered to the inclined feeder 16 which delivers them to the raised platform 17, where the sheets are matched and doubled. This doubling is preferably done by a doubling machine, such as that illustrated and described in a patent granted to me March 15, 1910, No. 952,052, although it is apparent that the doubling may be done by hand. The platform 17, being raised above the mill-floor, is free from the grease, dirt and scale of said mill-floor, and consequently there is no liability of the sheets getting any of such grease, scale or dirt between them which results in defective sheets.

By my method, up to this point, I am able to dispense with the "run-over pass", as the metal has been reduced in the rolls, without reheating, to a gauge suitable for doubling, so that when the plates are delivered to the platform 17 the matching and doubling takes place as one operation.

The sheets thus matched and doubled into 4-ply are then delivered to the feed-table 18 to be delivered into the furnace 3, a supplemental feed-table 19 being employed to lower the plate down through the opening 5 of the furnace. In this way, by having the doubling platform 17 and the feed-table 18 at a proper height, there is no interference with the operators working around on the mill-floor below. The doubled-pack, after being properly heated in the furnace 3, is withdrawn and delivered to the feed-table 6, which is shifted over in position to receive the pack as it comes from the furnace 3, as clearly indicated in dotted lines, Fig. 1, and the pack is delivered to the rolls to be passed back and forth through the same until reduced to the proper gauge, whereupon the pack is delivered by the feed-rolls 13 to the tables 15 and 16 to be discharged on the doubling platform 17 where the pack is again doubled to 8-ply. The pack is again delivered to the furnace 3 to be reheated and delivered back to the rolls for further rolling, and when the metal has been brought to the proper length it is thrown out in the rear for cooling. While I prefer to do the doubling at an elevation it may be done on the floor level in the rear of the mill, and carried thence by a conveyer to the furnace without coming in contact with the mill-floor.

By my method the bars, or the pack rolled therefrom, never come in contact with the mill-floor, and consequently do not pick up the scale, dirt or grease which results in so many wasters, the doubling and matching all being done at an elevation well about the mill-floor. This does away with the congestion around the rolls where the matching and doubling are done on the mill-floor, and leaves more space for the operators, which makes it possible to reduce the number of men required to do the work.

What I claim is:

1. The method of manufacturing sheet metal consisting in rolling the heated bars back and forth in the rolls keeping the metal from contact with the mill-floor during rolling until reduced to a gauge for matching and doubling, elevating the sheets to a point above the mill-floor, matching and doubling the sheets at this elevation, and passing the sheets while still in the elevated position back to the heating furnace.

2. The method of manufacturing sheet metal consisting in heating the bars in a furnace, delivering the heated bars from the furnace to the rolls in a plane above the mill-floor, passing the metal back and forth through the rolls keeping the metal from contact with the mill-floor until reduced to a gauge for matching and doubling, elevating the sheets to a point above the mill-floor, matching and doubling at this elevation, and passing the sheets while in elevated position back to the heating furnace.

3. The method of manufacturing sheet metal consisting in delivering the heated bars from the furnace to the rolls in a plane above the mill-floor, passing the metal back and forth through the rolls, keeping the metal from contact with the mill-floor until reduced to a gauge for matching and doubling, doubling the metal in the rear of the rolls, and conveying the metal in a plane above the mill-floor back to the heating furnace.

4. The method of manufacturing sheet metal consisting in delivering the heated bars from the furnace to the rolls in a plane above the mill-floor, passing the metal back and forth through the rolls, keeping the metal from contact with the mill-floor until reduced to a gauge for matching and doubling, doubling the metal in the rear of the rolls, conveying the metal out of contact with the mill-floor back to the front side of the rolls to the reheating furnace, reheating the doubled pack to rolling temperature, conveying the hot doubled pack from the furnace to the rolls and rolling the pack by passing it repeatedly through the same rolls while maintaining the pack out of contact with the mill-floor until the stock is reduced to the desired gauge.

5. The method of manufacturing sheet metal consisting in delivering the heated bars in a plane above the mill-floor from the furnace to the rolls, passing the metal back and forth through the rolls, keeping the metal from contact with the mill-floor until reduced to sheets of a gauge for matching and doubling, matching the sheets, doubling the matched sheets in the rear of the rolls to form a pack, conveying the pack out of contact with the mill-floor back to the front side of the rolls to the reheating furnace, reheating the doubled pack to rolling temperature, conveying the hot doubled pack out of contact with the mill-floor from the furnace to the same rolls and rolling the pack by passing it repeatedly through the same rolls while maintaining the pack out of contact with the mill-floor until the stock is reduced to the desired gauge.

6. The method of manufacturing sheet metal consisting in delivering the heated bars in a plane above the mill-floor from the furnace to the rolls, passing the metal back and forth through the rolls, keeping the metal from contact with the mill-floor until reduced to sheets of a gauge for matching and doubling, matching and doubling the sheets in the rear of the rolls to form a pack, conveying the pack out of contact with the mill-floor back to the front side of the rolls to the reheating furnace, reheating the doubled pack to rolling temperature, conveying the hot doubled pack out of contact with the mill-floor to the same rolls and rolling the pack by passing it repeatedly through the same rolls while maintaining the pack out of contact with the mill-floor until the stock is reduced to the desired gauge.

7. The method of manufacturing sheet metal which consists in delivering heated bars in a plane above the mill-floor from a furnace positioned in front of a roll stand to the rolls thereof, passing the metal repeatedly through the rolls while keeping it from contact with the mill-floor until reduced to a gauge for matching and doubling, doubling the metal in the rear of the rolls to form a pack, conveying the doubled pack from the rear of the rolls past the roll stand to a point in front of the rolls while keeping the pack out of contact with the mill-floor, reheating the doubled pack to rolling temperature in front of the rolls, conveying the reheated pack out of contact with the mill-floor to rolls and passing the pack repeatedly therethrough while maintaining it out of contact with the mill-floor until the stock is reduced to the desired gauge.

8. The method of manufacturing sheet metal which consists in delivering heated bars in a plane above the mill-floor from a furnace positioned in front of a roll stand to the rolls thereof, passing the metal repeatedly through the rolls while keeping it from contact with the mill-floor until reduced to a gauge for matching and doubling, doubling the metal in the rear of the rolls to form a pack, conveying the doubled pack from the rear of the rolls past the roll stand to a point in front of the rolls while keeping the pack out of contact with the mill-floor, reheating the doubled pack to rolling temperature in front of the rolls, conveying the hot doubled pack out of contact with the mill-floor from the point in front of the rolls back to the same rolls and passing the pack repeatedly through the rolls while maintaining it out of contact with the mill-floor until reduced to the desired gauge.

9. The method of manufacturing sheet metal which consists in delivering heated bars in a plane above the mill-floor from a furnace positioned in front of a roll stand to the rolls thereof, passing the metal repeatedly through the rolls while keeping it from contact with the mill-floor until reduced to a gauge for matching and doubling, doubling the metal in the rear of the rolls to form a pack, conveying the doubled pack from the rear of the rolls past the roll stand to a point in front of the rolls while keeping the pack out of contact with the mill-floor, reheating the doubled pack to rolling temperature in front of the rolls, conveying the reheated pack out of contact with the mill-floor to rolls, passing the pack repeatedly therethrough while maintaining it out of contact with the mill-floor, again doubling the pack in the rear of the rolls and again conveying the twice doubled pack from the rear to the front past the rolls while maintaining it out of contact with the mill-floor, reheating the twice doubled pack at a point in front of the rolls, and, while maintaining the hot twice doubled pack out of contact with the mill-floor, conveying it to rolls and passing it repeatedly therethrough until the stock is brought to desired length.

10. The method of manufacturing sheet metal which consists in delivering heated bars in a plane above the mill-floor from a furnace positioned in front of a roll stand to the rolls thereof, passing the metal repeatedly through the rolls while keeping it from contact with the mill-floor until reduced to a gauge for matching and doubling, doubling the metal in the rear of the rolls to form a pack, conveying the doubled pack from the rear of the rolls past the roll stand to a point in front of the rolls while keeping the pack out of contact with the mill-floor, reheating the doubled pack to rolling temperature in front of the rolls, conveying the hot doubled pack out of contact with the mill-floor from the point in front of the rolls to the same rolls, passing the pack repeatedly through the rolls while maintaining it out of contact with the mill-floor, again doubling the pack in the rear of the rolls and again conveying the twice doubled pack from the rear to the front past the roll stand while maintaining it out of contact with the mill-floor, reheating the twice doubled pack at a point in front of the rolls, conveying the hot twice doubled pack back to the same rolls while maintaining it out of contact with the mill-floor and passing the hot twice doubled pack repeatedly through the rolls while maintaining it out of contact with the mill-floor until the pack is brought to desired length.

11. The method of manufacturing sheet metal consisting in delivering the heated bars from the furnace to the rolls in a plane above the mill-floor, passing the metal back and forth through the rolls, keeping the metal from contact with the mill-floor until reduced to a gauge for matching and doubling, conveying the metal rearwardly away from the rolls while maintaining it out of contact with the mill-floor, doubling the metal in the rear of the rolls, conveying the metal out of contact with the mill-floor back to the front side of the rolls to the reheating furnace, reheating the doubled pack to rolling temperature, conveying the hot doubled pack from the furnace to the rolls and rolling the pack by passing it repeatedly through the same rolls while maintaining the pack out of contact with the mill-floor until the stock is reduced to the desired gauge.

12. The method of manufacturing sheet metal consisting in delivering heated bars in a plane above the mill-floor, from a furnace to rolls of a roll stand, passing the metal repeatedly between the rolls until reduced to a gauge for matching and doubling, while keeping the metal from contact with the mill-floor, doubling the matched sheets in the rear of the rolls to form a pack, conveying the pack out of contact with the mill floor to a heating furnace, reheating the pack to rolling temperature, conveying the heated pack out of contact with the mill-floor from the furnace, passing the pack repeatedly between rolls and keeping the pack out of contact with the mill-floor until reduced to the desired finished gauge.

13. The method of manufacturing sheet metal consisting in delivering heated bars in a plane above the mill-floor from a furnace to a stand of rolls, passing the metal repeatedly between the rolls of the stand while keeping the metal from contact with the mill-floor until reduced to sheets of a gauge for doubling, doubling the metal in the rear of the rolls to form a pack, conveying it out of contact with the mill-floor to a heating furnace, reheating the pack, conducting it from the furnace out of contact with the mill-floor to and passing it repeatedly between the rolls of a roll stand until it is brought to the desired gauge and finally putting it aside to cool.

14. The method of manufacturing sheet metal consisting in delivering heated bars in a plane above the mill-floor, from a furnace to a stand of rolls, passing the metal repeatedly between the rolls of the stand while keeping the metal from contact with the mill-floor until reduced to sheets of a gauge for matching and doubling, matching and doubling the metal in the rear of the rolls, conveying it out of contact with the mill-floor to a heating furnace, reheating the pack, conducting it from the furnace out of contact with the mill-floor to and passing it repeatedly between rolls of a roll stand until it is brought to the desired gauge.

15. The method of manufacturing sheet metal consisting in passing heated metal repeatedly between rolls, matching, doubling, reheating and automatically passing the matched and doubled metal repeatedly between rolls of a roll stand, the metal being kept in a plane above the mill floor at substantially all times while being transferred from a furnace to the rolls and while being conveyed to a furnace after being doubled.

16. The method of manufacturing sheet metal consisting in automatically passing heated metal repeatedly between two rolls, matching, doubling, reheating and again automatically passing the matched and doubled metal repeatedly between two rolls, the metal being kept in a plane above the mill-floor at substantially all times while being transferred from a furnace to the rolls and being reduced to a gauge suitable for matching and doubling and while being conveyed to a furnace after being doubled.

17. The method of manufacturing sheet metal consisting in passing heated metal repeatedly between two rolls, matching, doubling, reheating and automatically passing the matched and doubled metal repeatedly between two rolls, the metal being kept in a plane above the mill-floor at substantially all times while being transferred from a furnace to the rolls and while being conveyed to a furnace after being doubled.

In testimony whereof, I hereunto affix my signature this 8th day of June, 1932.

LAWRENCE C. STEELE.